United States Patent Office
3,839,341
Patented Oct. 1, 1974

3,839,341
SUBSTITUTED 1,3,8-TRIAZASPIRO[4.5]DECANES
William George Scharpf, West Amwell Township, Hunterdon County, and Hugo Stange, Princeton, N.J., assignors to FMC Corporation, New York, N.Y.
No Drawing. Filed June 13, 1966, Ser. No. 556,854
Int. Cl. C07d 29/18, 29/20
U.S. Cl. 260—293.66
9 Claims

ABSTRACT OF THE DISCLOSURE

Ketals of 8 - (3 - aroylpropyl) - 4 - oxo - 1 - phenyl-1,3,8 - triazaspiro[4.5]decanes, useful as neuroleptic agents are described. A representative example is 3 - ethyl - 8-[3 - (2 - p - fluorophenyl - 2 - dioxolanyl)propyl] - 4 - oxo-1-phenyl-1,3,8-triazaspiro[4.5]decane hydrochloride.

---

This invention relates to neuroleptically active compounds based on 1,3,8-triazaspiro[4.5]decanes. The invention also pertains to the preparation of the aforenamed compounds and to pharmaceutical compositions containing them.

1,3,8-triazaspiro[4.5]decane is the class name applied to the organic ring system I. 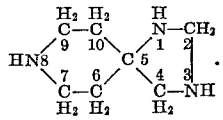

It is known only in the form of various derivatives. Such compounds are prepared by reacting a 4-piperidone or an alkaline metal 4-hydroxypiperidine-4-sulfonate wherein the piperidyl nitrogen is protected by, for instance, a benzyl group with a primary amine and an alkali metal cyanide whereby there is introduced into the 4-position of the piperidine ring a nitrile and secondary amino group. The reaction is commonly conducted in an aqueous alcohol system in the presence of one equivalent of hydrochloric acid or in an aqueous organic carboxylic acid system such as acetic acid. The resulting product is then treated with a strong mineral acid such as hydrochloric acid, phosphoric acid or preferably sulfuric acid to effect hydrolysis of the cyano group to the corresponding amide function. The resulting product is condensed with formamide in the presence of an inorganic acid such as sulfuric acid to bring about cyclization to the 2,4,8-triazaspiro[4.5]decane. Where the cyclization is carried out with an intermediate in which the secondary amino group is alkylamino one commonly ends up with a corresponding 1,3,8-triazaspiro[4.5]dec-2-ene whereas arylamino results in 1,3,8-triazaspiro[4.5]decane. The decene can be reduced to the decane by typical reduction procedures and materials and in this connection lithium aluminum hydride or sodium aluminum hydride are both effective and convenient reducing agents. Another method for ring closing the carboxamidopiperidine is to treat it with an acylating agent, particularly an anhydride of an aliphatic carboxylic acid of low molecular weight. This procedure results in the unsaturated 1,3,8-triazaspiro[4.5]dec-2-ene having in the 1-position thereof, a substituent identical to the aliphatic carboxylic acid residue of the particular anhydride employed.

A benzyl group may be used to protect the piperidyl nitrogen during the early stages of the synthesis and later can be removed and replaced by other substituents. For further details on the synthesis of 4-oxo-1,3,8-triazaspiro[4.5]decanes, the technical and chemical literature should be consulted and in this connection reference is made to such typical publications as U.S. Pat. 3,155,670 to Janssen and J. Org. Chem., 26, 4480 (1961).

An interesting class of 1,3,8-triazaspiro[4.5]decanes is described in the aforementioned U.S. patent to Janssen. These compounds which exhibit neuroleptic activity are referred to as 4-oxo-1,3,8-triazaspiro[4.5]decanes having attached to the 1 and 8 positions respectively a hydrocarbon group and a benzoylalkyl group. In some instances the 3-position carries a lower alkyl or acyl moiety. The configuration of the Janssen compounds is more readily visualized by reference to the following general formula:

II. 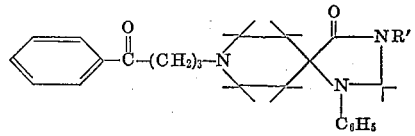

wherein R' represents hydrogen or lower alkyl.

We have now discovered a class of 1,3,8-triazaspiro[4.5]decanes having neuroleptically active properties greatly exceeding those of previously known materials and the provision of these new derivatives and their use as neuroleptic agents constitutes the principal object and purpose of the present invention. Other objects and purposes will become apparent subsequently.

The new and more virulent compounds of the invention can be collectively referred to as ketals of 8-(3-aroylpropyl) - 4-oxo-1-phenyl-1,3,8triazaspiro[4.5]decanes of the following general formula:

III. 

and the acid addition salts thereof wherein R is hydrogen or lower alkyl of 1 to 4 carbon atoms, e.g., methyl, ethyl, n-propyl, isopropyl, n-butyl, etc., lower alkenyl such as allyl, etc., X is hydrogen or fluorine, $R_1$ and $R_2$, which may be alike or different, each represent a lower alkyl as above shown for R while taken together $R_1$ and $R_2$ represent the number of carbon atoms to form or complete a dioxolane ring or a dioxane ring.

The compounds of the invention are prepared by alkylating the requisite 1,3,8-triazaspiro[4.5]decane with the appropriate ketal substituted alkyl halide in accordance with the following scheme:

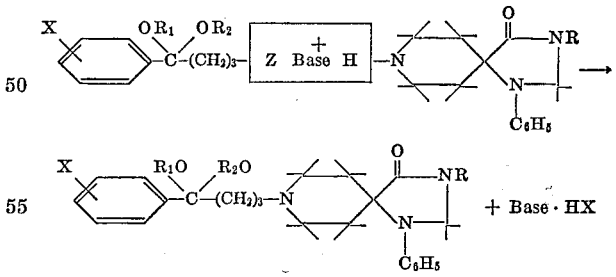

wherein R, $R_1$, $R_2$ and X have the values previously assigned and Z designates an anion, e.g., sulfonates, usually

and halogen, usually bromine or chlorine.

The reaction is of general scope and applicability. Preferably it is performed by heating at mildly elevated temperatures essentially stoichiometric amounts of the reactants and base in the presence of a normally liquid organic solvent. An especially convenient mode of operation consists in refluxing the mixture of solvent and components until the reaction is complete. Generally speaking, excellent results are achieved by refluxing the components for a period of from a few minutes to about three hours at temperatures ranging from about room temperature to about 250° C. A trace of an alkali metal iodide, e.g., sodium or potassium iodide, facilitates the reaction. Examples of suitable bases include both mineral and organic types as exemplified by tertiary organic amines such as pyridine, quinoline, triethylamine, triethylenediamine, trimethylamine and the like while typical mineral bases are represented by the alkali metal carbonates of which sodium or potassium carbonate is most convenient and preferable. Isolation and purification of the final product is effected by the usual organic techniques such as crystallization, sublimation and the like.

Where R is alkenyl such as allyl, it is necessary to introduce the R subsequent to alkylation with the ketal alkylhalide. Otherwise the allyl group is reduced to propyl when debenzylating the 1,3,8-triazaspirol[4.5] decane with palladium catalyst. We have found that allyl can be introduced in the final stage by alkylating the 3-position with sodium hydride and reacting the so-formed sodium salt with allyl halide, e.g., allyl bromide. Example 6 specifically illustrates this novel approach for making ketals of 3 - alkenyl - 8-(3-aroylpropyl)-4-oxo-1-phenyl-1,3,8-triazaspiro[4.5]decanes.

The compounds of the invention in the form of their free base tend to be oils or low melting solids. They may be converted to useful addition salts of higher melting point by reacting them with suitable acids which typical examples include hydrochloric, hydrobromic, hydriodic, sulfuric, nitric, phosphoric, thiocyanic, acetic, propionic, glycolic, lactic, pyruvic, oxalic, malonic, maleic, fumaric, malic, tartaric, citric, benzoic, cinnamic, mandelic, methanesulfonic, ethanesulfonic, p-toluenesulfonic, salicylic and the like.

The ketal containing alkylhalide for alkylating the piperidine nitrogen is prepared using a procedure patterned after the reaction disclosed in Ber., 40, 3903 (1907) and Ber., 72, 600 (1939). Such materials are formed by reacting the requisite ketone with the appropriate alcohol or glycol in the presence of p-toluenesulfonic acid or other acidic material such as hydrochloric acid and isolating the resultant ketal. Further details on the preparation of these compounds can be obtained by consulting the aforesaid references.

As previously pointed out the compounds of the invention are exceedingly active as neuroleptic agents. In fact they unexpectedly cause much more pronounced sedation in animals, particularly in primates, then the sedation effects of their known keto precursors as disclosed in the aforereferred to Janssen patent. Thus, the novel compounds herein are more powerful medicaments of the tranquilizer type for various mental and central nervous system disorders.

The invention is illustrated in greater detail by the following non-limiting examples.

EXAMPLE 1

3 - ethyl - 8-[3-(2-p-fluorophenyl-2-dioxolanyl)propyl]-4 - oxo - 1-phenyl-1,3,8-triazaspiro[4.5]decane hydrochloride A mixture of 2.9 g. (0.011 mole) of 3-ethyl-4-oxo-1-phenyl-1,3,8-triazaspiro[4.5]decane, 2.5 g. (0.010 mole) of 2-(3-chloropropyl)-2-p-fluorophenyldioxolane, 2.8 g. (0.026 mole) of sodium carbonate, a trace of potassium iodide, and 60 ml. of 4-methyl-2-pentanone was stirred and heated at reflux for 60 hours, cooled, treated with 20 ml. of water, filtered, and separated. The water layer was extracted twice with 20 ml. portions of chloroform. The combined organic layers were washed with 20 ml. of water, dried with magnesium sulfate, filtered, and concentrated in vacuum to give 4.4 g. of oil. This was crystallized from 25 ml. of toluene to give 0.3 g. of by-product, m.p. 129–31° C. The mother liquor was diluted with 30 ml. of benzene, dried with magnesium sulfate, filtered, and treated with anhydrous HCl to give crude hydrochloride, which was recrystallized from 30 ml. of isopropanol to give 2.0 g. (40%) of the desired product, m.p. 232–4° C. Infrared spectra and elemental analysis confirmed the structure.

EXAMPLE 2

8-[3-(2-p-fluorophenyl-2-dioxolanyl)propyl]-3-methyl-4-oxo-1-phenyl-1,3,8-triazaspiro[4.5]decane A mixture of 1.84 g. (0.007 mole) of 2-(3-chloropropyl)-2-p-fluorophenyldioxolane, 2.0 g. (0.007 mole) of 3 - methyl - 4 - oxo - 1 - phenyl-1,3,8-triazaspiro[4.5] decane hydrochloride, 2.1 g. (0.02 mole) of sodium carbonate, a trace of potassium iodide, and 45 ml. of 4-methyl-2-pentanone was stirred, refluxed for 48 hours, cooled, treated with 20 ml. of water, and separated. The aqueous layer was extracted with 15 ml. of chloroform. The combined organic layers were dried with magnesium sulfate, filtered, and concentrated to give 3.7 g. of oil. This was dissolved in toluene, treated with anhydrous HCl, filtered, and recrystallized from 40 ml. of 2-butanone to give 1.2 g. (32%) of product, m.p. 254–6° C. An analytical sample was recrystallized from 50% ethanol-ether, m.p. 258–9° C. Infrared spectra and elemental analysis confirmed the structure.

EXAMPLE 3

8-[4,4-diethoxy-4-(4-fluorophenyl)butyl]-3-methyl-4-oxo-1-phenyl-1,3,8-triazaspiro[4.5]decane A stirred mixture of 2.8 g. (0.01 mole) of 4-chloro-1,1-diethoxy-1-(4-fluorophenyl)butane, 3.2 g. (0.03 mole) of sodium carbonate, 2.5 g. (0.01 mole) of 3-methyl-4-oxo-1-phenyl-1,3,8-triazaspiro[4.5]decane, a trace of potassium iodide, and 50 ml. of 4-methyl-2-pentanone was heated at reflux temperature for 64 hours, then successively cooled, washed with 30 ml. of water, dried with magnesium sulfate, filtered, and concentrated in vacuum to give 4.6 g. of oil. The oil was crystallized from 80 ml. of ether and then from pentane to give 0.7 g., m.p. 86–7° C. of product. An unidentified solid 1.4 g., m.p. 111–17° C. was isolated from the mother liquors. The structure of the desired product was confirmed by infrared spectra and elemental analysis.

EXAMPLE 4

3 - (2 - butyl) - 8 - [3-(2-p-fluorophenyl-2-dioxolanyl)-propyl]-4-oxo-1-phenyl - 1,3,8 - triazaspiro[4.5]decane hydrochloride A stirred mixture of 2.8 g. (0.01 mole) of 3-(2-butyl)-4-oxo-1-phenyl-1,3,8-triazaspiro[4.5]decane, 2.5 g. (0.01 mole) of 2-(3-chloropropyl)-2-p-fluorophenyldioxolane, 2.5 g. (0.024 mole) of sodium carbonate, a trace of potassium iodide, and 40 ml. of 4-methyl-2-pentanone was refluxed for 48 hours, then cooled, treated with 30 ml. of water, and separated. The water layer was extracted with two 30 ml. portions of 4-methyl-2-pentanone. The combined organic layers were washed with 40 ml. of water, dried with magnesium sulfate, filtered, and concentrated in vacuum to give 4.5 g. of viscous oil. This was extracted with 15 ml. of methylcyclohexane to remove 0.6 g. of insolubles, then the solution was concentrated in vacuum, dissolved in 100 ml. of hexane, treated with hydrogen chloride, and filtered to give 2.5 g. of solid, m.p. 162–8° C. An analytical sample was crystallized from 2-butanone, m.p. 191–3° C., and the remainder crystallized from 50 ml. of toluene to give 2.0 g., m.p. 175–88° C. The 2 g. was recrystallized from 50 ml. of 2-butanone to give 1.0 g. of crude product, m.p. 184–8° C., and a second crop of 0.2 g., m.p. 186–91° C., a combined yield of 23%. Infrared spectra and elemental analysis confirmed the structure of compound.

EXAMPLE 5

8-[3-(2-*p*-fluorophenyl-2-dioxolanyl)propyl]-4-oxo-1-phenyl-1,3,8-triazaspiro[4.5]decane A mixture of 16.9 g. (0.073 mole) of 4-oxo-1-phenyl-1,3,8-triazaspiro[4.5]decane, 20.4 g. (0.073 mole) of 2-(3-chloropropyl) - 2 - (4-fluorophenyl)dioxolane, 18.6 g. (0.175 mole) of sodium carbonate, 0.5 g. of potassium iodide, and 270 ml. of 4-methyl-2-pentanone was stirred and heated at reflux temperature for 42 hours, then successively cooled, washed with 200 ml. of water, dried with magnesium sulfate, filtered, and concentrated in vacuum to give 35.7 g. of oil which solidified on standing. This was crystallized from 300 ml. of isopropanol to give 12.8 g. of product, m.p. 126–8° C., and 2.3 g. of second crop, m.p. 119–23° C. The mother liquor was concentrated and crystallized from 500 ml. of hexane and recrystallized from 70 ml. of isopropanol to give 4.4 g., m.p. 115–24° C., and crystallized again from 200 ml. of ether to give 2.4 g., m.p. 157–8° C., total yield 17.5 g. (55%). A sample of the first product fraction was recrystallized from methylcyclohexane and melted from 126.0–8.5° C., and a portion of this was crystallized again from hexane, m.p. 157–8° C. The infrared spectra of both the low melting and the high melting isomers were identical.

EXAMPLE 6

3-allyl-8-[3-(2-*p*-fluorophenyl-2-dioxolanyl)propyl]-4-oxo-1-phenyl-1,3,8-triazaspiro[4.5]decane To a stirred solution of 4.4 g. (0.01 mole) of the spirodecane, m.p. 126–8° C. of Example 5, in 30 ml. of dimethylformamide, dried over molecular sieve, under nitrogen was added 0.50 g. (0.01 mole) of 50% sodium hydride in mineral oil. The mixture was stirred an additional 3 hours, then was successively treated with 1.4 g. (0.011 mole) of allyl bromide, shaken for 16 hours at 40° C., cooled, treated with 70 ml. of water, and extracted with three 75 ml. portions of chloroform. The combined organic extracts were dried over magnesium sulfate, filtered, and concentrated in vacuum to give 5.4 g. of oil. This was extracted with 100 ml. of boiling toluene and the extract was concentrated and crystallized from 40 ml. of isopropanol to give 2.2 g. (46%) of product, m.p. 115.0–6.5° C. An analytical sample was recrystallized from hexane, m.p. 115.5–7.5° C. Infrared spectra and elemental analysis confirmed its structure.

EXAMPLE 7

3-butyl-8-[3-(2-*p*-fluorophenyl-2-dioxolanyl)propyl]-4-oxo-1-phenyl-1,3,8-triazaspiro[4.5]decane This compound was prepared by the procedure followed in the previous examples using 1-bromo-2-methylpropane as the alkylating agent. The melting point of the purified product is 130.0–130.5° C. Its elemental and infrared analysis was in conformity with the above named structure.

This is another illustration wherein the 3-substituent is introduced after alkylation of the piperidine nitrogen.

EXAMPLE 8

8-[3-(2-*p*-fluorophenyl-1,3-dioxan-2-yl)propyl]-3-methyl-4-oxo-1-phenyl-1,3,8-triazaspiro[4.5]decane This compound was prepared following the procedure of the previous examples using 2-(3-chloropropyl)-2-(4-fluorophenyl)-1,3-dioxane as the alkylating agent. In general the yields and results paralleled those obtained in the previous examples. The melting point of the purified material is 144.5–146.0° C. Its elemental and instrumental analysis was in conformity with the above named structure.

As will be apparent to those skilled in the art numerous modifications and variations of the embodiments illustrated herein may be made without departing from the spirit of the invention or the scope of the appended claims.

What is claimed is:

1. A 1,3,8,-triazaspiro[4.5]decane of the formula:

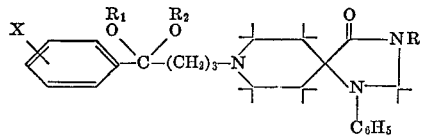

and the acid addition salts thereof wherein R is selected from the class consisting of hydrogen, lower alkenyl and lower alkyl 1 to 4 carbon atoms, X is selected from the class consisting of hydrogen and fluorine and $R_1$ and $R_2$ each represent a lower alkyl as above given for R, while taken together $R_1$ and $R_2$ represent the number of carbon atoms to complete a dioxolane ring or a dioxane ring.

2. A 1,3,8-triazaspiro[4.5]decane of claim 1 having the formula:

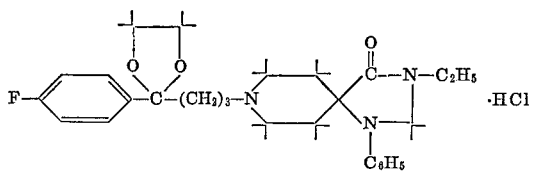

3. A 1,3,8-triazaspiro[4.5]decane of claim 1 having the formula:

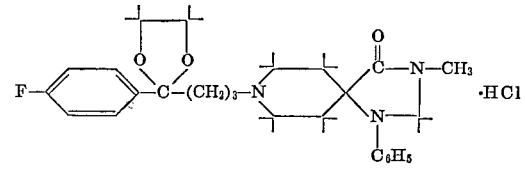

4. A 1,3,8-triazaspiro[4.5]decane of claim 1 having the formula:

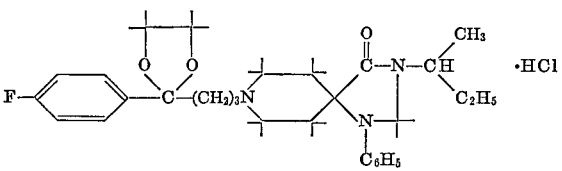

5. A 1,3,8-triazaspiro[4.5]decane of claim 1 having the formula:

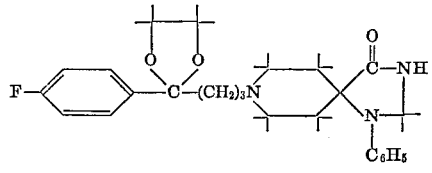

6. A 1,3,8-triazaspiro[4.5]decane of claim 1 having the formula:

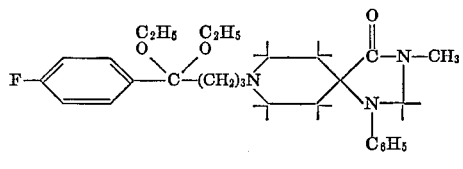

7. A 1,3,8-triazaspiro[4.5]decane of claim 1 having the formula:

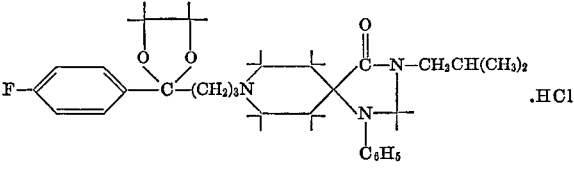

8. A 1,3,8-triazaspiro[4.5]decane of claim 1 having the formula:
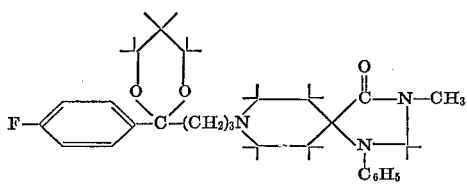
9. A 1,3,8-triazaspiro[4.5]decane of claim 1 having the formula:
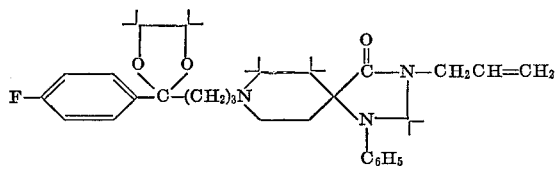
References Cited
UNITED STATES PATENTS
3,141,021   7/1964   Janssen _____ 260—294.7
3,262,938   7/1966   Hardie et al. _____ 260—294.7
OTHER REFERENCES
Katritzky et al.: Advances in Heterocyclic Chemistry, vol. 7, Academic Press, New York, pp. 264–265.
LELAND A. SEBASTIAN, Primary Examiner
U.S. Cl. X.R.
260—999

UNITED STATES PATENT OFFICE
CERTIFICATE OF CORRECTION

Patent No. 3,839,341  Dated October 1, 1974

Inventor(s) William George Scharpf and Hugo Stange

It is certified that error appears in the above-identified patent and that said Letters Patent are hereby corrected as shown below:

Column 2, line 30, Formula III

" 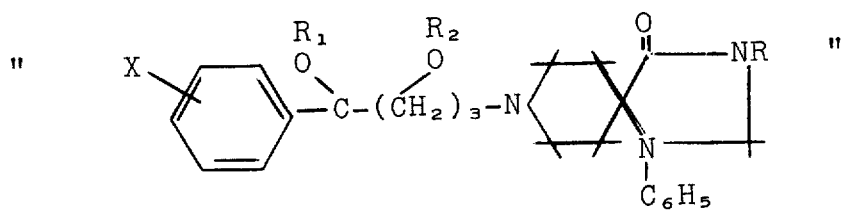 "

should read

-- 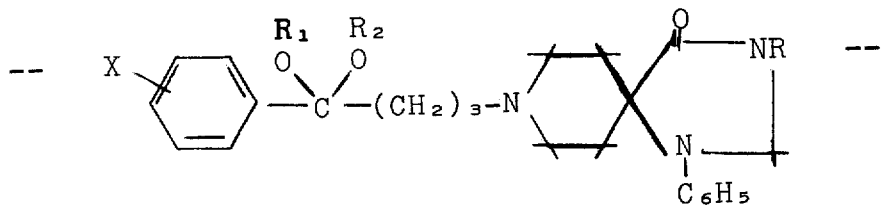 --

Signed and Sealed this twenty-third Day of September 1975

[SEAL]

Attest:

RUTH C. MASON
Attesting Officer

C. MARSHALL DANN
Commissioner of Patents and Trademarks